(12) United States Patent
Brooks et al.

(10) Patent No.: US 10,157,298 B1
(45) Date of Patent: Dec. 18, 2018

(54) APPARATUS AND METHOD TO ASSESS CONTENTS OF WEARABLE ITEMS

(71) Applicant: VORBECK MATERIALS CORP., Jessup, MD (US)

(72) Inventors: Louise Brooks, Washington, DC (US); Sriram Manivannan, Baltimore, MD (US); James Brent, Glenwood, MD (US); Can Gun Yaprak, Helethorpe, MD (US)

( * ) Notice: Subject to any disclaimer, the term of this patent is extended or adjusted under 35 U.S.C. 154(b) by 0 days.

(21) Appl. No.: 15/886,823

(22) Filed: Feb. 1, 2018

(51) Int. Cl.
| | |
|---|---|
| *G08B 1/08* | (2006.01) |
| *G06K 7/10* | (2006.01) |
| *G06F 1/16* | (2006.01) |
| *H04W 4/38* | (2018.01) |
| *A45C 13/04* | (2006.01) |
| *A45C 13/00* | (2006.01) |
| *A45C 13/02* | (2006.01) |

(52) U.S. Cl.
CPC ........ *G06K 7/10376* (2013.01); *A45C 13/001* (2013.01); *A45C 13/02* (2013.01); *A45C 13/04* (2013.01); *G06F 1/163* (2013.01); *H04W 4/38* (2018.02)

(58) Field of Classification Search
CPC ...... G06K 7/10376; A45C 13/02; A45C 13/04
USPC ............ 340/539.11, 539.13, 572.1, 5.7, 10.2
See application file for complete search history.

(56) References Cited

U.S. PATENT DOCUMENTS

| | | | |
|---|---|---|---|
| 8,068,023 B2* | 11/2011 | Dulin ........................ | B60P 3/03 340/539.11 |
| 8,659,420 B2* | 2/2014 | Salvat, Jr. ............. | G01S 5/0027 340/539.13 |
| 2016/0232387 A1* | 8/2016 | Myers ................ | G06K 7/10415 |

* cited by examiner

*Primary Examiner* — Tai T Nguyen
(74) *Attorney, Agent, or Firm* — Trentice V. Bolar, Esq.

(57) ABSTRACT

In some embodiments, frames and methods are provided herein useful to assess the contents of wearable items (personal wearable item). In some embodiments, the frame includes a substrate and a system positioned on a section of the frame's substrate. The substrate includes sections positioned adjacent relative to each other and each distinguished by a demarcation; and coupling elements each configured to affix the substrate to a surface(s) of the wearable item. The system includes one or more control circuits, sensors, and I/O devices. The control circuit(s) can receive wireless signals transmitted by computing device; use the received signals to determine the present of the computing devices; and present the status of the presence of the wireless signal.

14 Claims, 8 Drawing Sheets

APPARATUS AND METHOD TO ASSESS CONTENTS OF WEARABLE ITEMS

REFERENCE TO RELATED APPLICATIONS

The present application is a claims priority to U.S. Provisional Application Ser. No. 62/428,790, filed Dec. 1, 2016, the entire contents of which are hereby incorporated by reference.

BACKGROUND

The present disclosure relates generally to the field of radio communications.

DETAILED DESCRIPTION

Personal wearable items that can store one or more objects (e.g., purses, backpacks, fanny packs, satchels, messenger bags, clutches, hand bags, attaches, brief cases, and similar flexible containers designed to store a person's personal effects) are typically utilized to alleviate the user of the task of holding items in their hands. For example, users may prescribe a heightened importance to particular items (e.g., cell phones, keys, wallets, and similar items) placed within such personal wearable items, but may not always be able to ensure that such important items are actually located in the wearable item without physical inspection thereof.

Generally speaking, pursuant to a plurality of embodiments, apparatuses and methods are provided herein useful to assess the contents of wearable items. In some embodiments, a frame apparatus can comprise a substrate comprising a plurality of sections positioned adjacent relative to each other and each distinguished by one or more demarcations; one or more coupling elements configured to affix the substrate to a surface(s) of the wearable item; and a system positioned on one or more sections. The system can comprise one or more sensors (e.g., one or more devices configured to send/receive electromagnetism) and I/O devices each communicatively coupled to one or more control circuit(s).

The control circuits can be configured to receive, via the sensor, wireless signals transmitted by first computing device and thereby determine the presence of the first computing device within a threshold distance relative to the sensor. Statuses may be presented, via I/O devices, when triggering event are generated. Status may be selected from the group consisting of: a first status reflecting that the wireless signal is received and a second status reflecting that the wireless signal has not been received. Wearable items can be personal items. Demarcation may include one or more of folding lines, creases, incision lines, and fasteners. The substrate can include an orientation configured to be modified according to one or more of the demarcations.

One or more conductive elements (e.g., antennas) can be positioned on one or more sections of the plurality of sections, each communicatively coupled to the control circuit(s) and configured to transmit and/or intercept electromagnetic energy. The conductive element may include a conductive composition comprising polymeric material and a three-dimensional network of fully exfoliated single sheets of graphene positioned therein. The fully exfoliated single sheets of graphene can have a surface area of 2,630 $m^2/g$. The frame may be included in a kit comprising assembly instructions that direct users to modify the substrate via one or more of the demarcations. The system can be configured to establish wireless local area networks with second computing device and communications links with cell sites. Wearable items disclosed herein may include the frame affixed to one or more surfaces thereof.

In some embodiments, methods are provided for forming a frame for assessing the contents of wearable items. A substrate can be formed to include a plurality of sections and one or more coupling elements, the plurality of sections positioned adjacent relative to each other and each distinguished by one or more demarcations. Coupling elements may be configured to affix the substrate to a surface(s) of the wearable item (e.g., a personal item). Demarcations may comprise one or more folding lines, creases, incision lines, and fasteners. The substrate may have an orientation configured to be modified according to the demarcations.

A system may be affixed on to a section(s) of the plurality of sections. The system may include one or more I/O devices communicatively coupled to one or more control circuits. A wireless signal transmitted by a device may be receives via a sensor(s) communicatively coupled to the control circuit (s). Presence of the device within a threshold distance relative to the frame determine may be determined using the sensor data. A first status may be presented via an I/O device communicatively coupled to the control circuit(s) when the wireless signal is received and a second status may be presented when the wireless signal is not received.

In some embodiments, forming the substrate can include forming one or more first sections of the plurality of sections to be demountable relative to one or more second sections of the plurality of sections. Forming the substrate, for example, may include forming first sections in a manner to be rotatably mounted to second sections of the plurality of sections. The method may further include transmitting, via a conductive element(s) communicatively coupled to the control circuit(s), electromagnetic energy. The conductive element may include a conductive composition that includes polymeric material and a three-dimensional network of fully exfoliated single sheets of graphene positioned within the polymeric material. The fully exfoliated single sheets of graphene may have a surface area of 2,630 m$^2$/g. A wireless local area network can be established using one or more of the control circuits with one or more second computing devices. A communications link with cell sites can be established using one or more of the control circuits.

Figure 1:
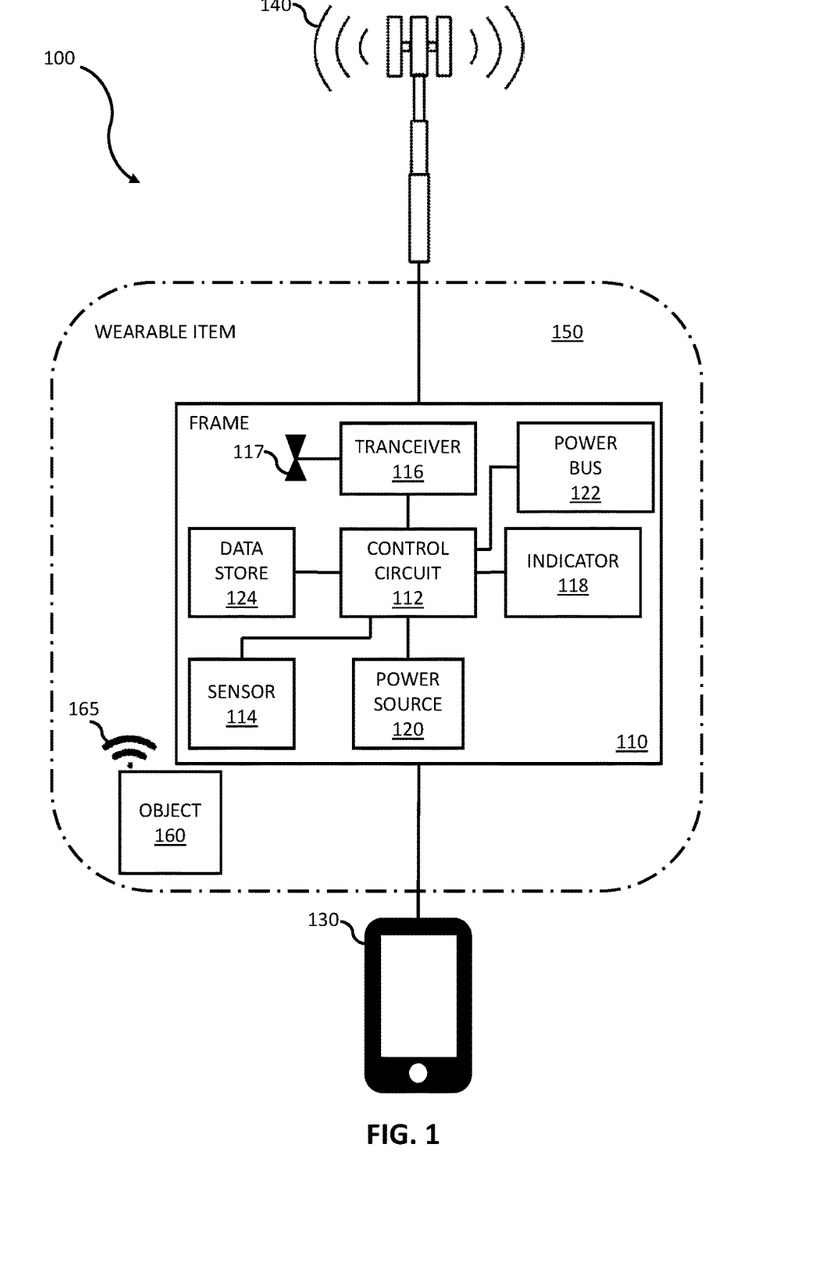
FIG. 1 illustrates a simplified block diagram of a system to assess the contents of wearable items, in accordance with some embodiments.

FIG. 1 illustrates a simplified block diagram of a system 100 to assess the contents of wearable items, in accordance with some embodiments. In some embodiments, system 100 can comprise one or more computing devices 130 and radio frequency ("RF") sources 140 communicatively coupled via frame 110. For example, the RF sources 140 can each include one or more electronic communications devices that together function as a cell in a cellular network. In certain embodiments, RF source 140 may include one or more sets of transmitters, receivers, antennas (i.e. conductive elements), transceivers, digital signal processors, control electronics, GPS receivers for timing, primary and backup electrical power sources, and/or similar devices. For example, one or more of the RF sources 140 can be an orbiting satellite that can communicate via one or more RF communication protocols. For example, such RF communication protocols may be based on GSM/EDGE, UMTS/HSPA, similar high speed communications protocols, or a combination of two or more thereof.

Electronic user devices 130 can include desktop computers, laptop computers, thin clients, servers, cluster computers, smart TVs, in-vehicle computing devices, wearable computing devices, mobile computing devices (e.g., smartphones, phablets, tablets, computing devices that can use cellular data communication protocols and/or wireless local area network protocols, or a combination of two or more thereof). In certain embodiments, electronic user devices 130 can be devices that can communicate with RF sources 140 via frame 110.

The wearable items 150 are typically designed to at least carry one or more personal effects objects for the user, e.g., object 160. In some embodiments, personal effects can include objects having a desired utility and/or the proximity of which is deemed psychologically beneficial to that particular user, such items may include, but are not limited to, cell phones, keys, and items of monetary exchange (i.e., cash, credit cards, crypto currency storage items, and similar means of exchange). Wearable items 150 can include purses, backpacks, fanny packs, satchels, messenger bags, clutches, hand bags, attaches, brief cases, and similar wearable items designed to carry a person's personal effects, in accordance with certain embodiments. For example, a psychologically dispositive experience may result in response to an inability to locate one's personal effects items in the wearable item.

In some embodiments, the frames 110 are structures that can be affixed to one or more surfaces of the wearables items 150 to provide thereto one or more of the computing functions disclosed herein. In some embodiments, the frames 110 can include a plurality of components included, but not limited to, one or more transceivers 116, power buses 122, I/O devices 118, data stores 124, power sources 120, sensors 114 each communicatively coupled to one or more control circuits 112. The frames 110 can be temporarily or permanently affixed to one or more surfaces of the wearable items 150 (discussed below). The frame 110 can include a substrate (e.g., single-layered or multi-layered) to house one or more of the components disclosed herein may be affixed. The substrate may include one or more fabrics (e.g., woven and/or non-woven), polymers, films, foams, or a combination of two or more thereof.

In one approach, applicable polymers can include, but are not limited to: polyethylene, polypropylene and copolymers thereof, polyesters, nylons, polystyrenes, polycarbonates, polycaprolactones, polycaprolactams, fluorinated ethylenes, polyvinyl acetate and its copolymers, polyvinyl chloride, polymethylmethacrylate and acrylate copolymers, high impact polystyrene, styrenic sheet molding compounds, polycaprolactones, polycaprolactams, fluorinated ethylenes, styrene acrylonitriles, polyimides, epoxys, polyethylene terephthalate and polyurethanes. Elastomers that can be compounded with FGS include, but are not limited to, poly[4,4'-methylenebis(phenyl isocyanate)-alt-1,4-butanediol/poly(butylene adipate)], poly[4,4'-methylenebis(phenyl isocyanate)-alt-1,4-butanediol/poly(butylene adipate)], poly [4,4'-methylenebis(phenyl isocyanate)-alt-1,4-butanediol/poly(butylene adipate)], poly[4,4'-methylenebis(phenyl isocyanate)-alt-1,4-butanediol/di(propylene glycol)/polycaprolactone, poly[4,4'-methylenebis(phenyl isocyanate)-alt-1,4-butanediol/polytetrahydrofuran, amine terminated polybutadiene such as HYCAR ATB2000X173, carboxyl terminated polybutadiene such as HYCAR CTB2000X162, polybutadiene, dicarboxy terminated butyl rubber, styrene/butadiene copolymers, polyisoprene, poly (styrene-co-butadiene), polydimethysiloxane, and natural latex rubber.

The polymers may be use alone or in combination. In some embodiments, the frames 110 can each comprise a plurality of sections each positioned adjacent relative to each other and each distinguished by demarcations (e.g., folding lines, creases, incision lines, fasteners, or a combination of two or more thereof). For example, the sections can be coupled together in a manner to allow the frame to be selectively oriented and/or minimized in a desired structure to accommodate inclusion within the wearable item 150. In some embodiments, two or more sections of the plurality of sections may be rotatably mounted to each other. In certain embodiments, two or more sections of the plurality of sections may be demountable relative to each other.

The frames 110 can each include one or more transceivers 116, power buses 122, I/O devices 118, sensors 114, power sources 120, or a combination of two or more thereof communicatively coupled via one or more control circuits 112, in accordance with certain embodiments. The one or more control circuits 112 can be configured to perform at least one of the steps, processes, and/or methods disclosed herein. The aforementioned components of the frames 110 require a power source for their operation. In some embodiments, such power sources have a power density that is high enough to power the aforementioned component for at least about 8-18 hours or more. For example, the power sources 120 can have a current draw of up to 2,000 mA and/or an operating voltage of 3.3V to 4.2V.

For example, the power sources 120 can include one or more primary batteries and/or secondary batteries (i.e. rechargeable batteries) that can each include one or more electrochemical cells that are combined to power one or more components of the frame 110. In embodiments where secondary batteries are utilized, power sources 120 can accept energy inductive charging, resonance charging, one or more radio frequencies, infrared light, ultrasound, and similar mediums. In some embodiments, the frames 110 can further provide power to external devices via the one or more power buses 122. Power buses 122, for example, are typically connection interfaces (e.g., connectors, sockets, outlets, ports, fasteners, and/or similar interfaces elements) that allow external power sources and/or electronic devices to connect thereto via a complementary structure and thereby receive power from power source 120. In some embodiments, the power buses 122 can include "female"

connectors that are generally receptacles for complementary "male" structures that are in electrical communication with external energy stores. For example, the power buses 122 can be configured to accept/receive/couple particularly connectors to prevent incorrect or damaging interconnections. Additionally, or alternatively, power bus 122 may facilitate wired communication between the electronic computing devices 130.

In some embodiments, the one or more transceivers 116 may be devices that can be utilized to facilitate communication with other electronic computing devices 130. Additionally, or alternatively, the control circuits 112 can use the transceivers 116 to communicate wirelessly with the one or more RF sources 140 and thereby establish a wireless communications network therewith. In certain embodiments, the antennas 117 (i.e. conductive elements) can be formed using conductive compositions that comprise polymeric material(s) and a three-dimensional network of fully exfoliated single sheets of graphene positioned in the polymeric material(s). The fully exfoliated single sheets of graphene can have a surface area of 2630 m2/g.

The one or more objects 160 can be items that the consumer desires to carry within wearable item 150 and track via devices 165 (e.g., cell phones, keys, mobile devices, wallet, credit card holders, similar items of importance, or a combination of two or more thereof). Devices 165 can be temporarily or permanently affixed to a surface of object 160 (e.g., via an adhesive, Velcro, a bonding agent, a mechanical attachment, similar affixing solutions, or a combination of two or more thereof). In certain embodiments, the device 165 and the object 160 are configured as one structure. The known location of object 160 is typically deemed psychologically advantageous to the user of the wearable item 150. For example, one or more devices 165 can be temporarily affixed to the object 160 via an adhesive. In certain embodiments, device 165 and object 160 can be configured as one device.

In some embodiments, the presence of a particular object 160 within the wearable item 150 can be determined using the one or more antennas 117 to transmit one or more RF signals to device 165 positioned proximate to the object 160. In response to receiving the transmitted RF signals, the devices 165 can transmit the unique character string (i.e., identification code) electronically stored therein. In some embodiments, the device 165 may include an internal power source that allows the device 165 to transmit the unique character string without receiving one or more RF signals from the one or more antennas 117. In embodiments wherein the one or more devices 165 include an internal power source, the devices 165 may be configured to transmit the unique character string at predetermined time intervals (e.g., as measured in seconds, minutes, hours, days, weeks, months, and/or years).

For example, the predetermined time intervals can be chosen in a manner to maximize the total number of transmissions per internal power source, the number of transmissions per hour by the device 165 sufficient to reassure (i.e. reduce perceived psychological discomfort) the consumer that the object 160 is present within the wearable item 150. The antenna 117 can be configured to receive the RF signal transmitted by device 165. In some embodiments, the unique identification code included in the received RF signal can be compared to known identification codes associated with the one or more devices 165. The known codes can be stored in one or more data stores 124 communicatively coupled to the control circuits 112. For example, the one or more data stores 124 may be external to wearable item 150 and accessible via RF source 140, electronic user device 130, the internet, a wireless network communicatively coupled to the control circuit s 112, similar sources, or a combination of two or more thereof.

The unique character strings may be encoded onto the devices 165 at their point of manufacture, upon receipt via the consumer using control circuits 112, by the retailer, similar means, or a combination of two or more thereof. In some embodiments, devices 165 can be designed for attachment to a particular object (e.g., keys, wallets, credit cards holders, mobile computing devices, similar objects) and encoded with a unique identifying code associated with that particular type of object. For example, the devices 165 may be include an orifice or affixing element(s) that allows the device to be selectively incorporated onto other structures. The devices 165 may be configured to have a substantially planar structure (e.g., to be inserted in to hand-sized containers, such as wallets). The devices 165 may comprise one or more surfaces having an adhesive material. In certain embodiments, the devices 165 can have a thickness of 5 mm or less.

In response to confirming the presence of a threshold relationship between the received identification code and a known identification code, the confirmation can be presented via the one or more I/O devices 118. In some embodiments, the I/O devices can emit visual and/or audible signals (e.g., conveying status information). For example, the I/O devices 118 can include one or more segment displays, video displays, text displays, semiconducting light sources (e.g., LEDs), electroluminescence devices, similar output devices, or a combination of two or more thereof. Confirmations may be include as one or more particular color lights (e.g., red, yellow, blue, green), pictures, words (e.g., "present" "confirmed"), phrases (e.g., "the item is present", "we are good to go",), images (e.g., thumbs up), icons, memes, similar indicators, or a combination of two or more thereof.

In response to failing to confirm an association between the received identification code and the known identification code, the I/O devices 118 can emit information that conveys the failed confirmation. Failed confirmations, for example, may be conveyed as one or more particular color lights (e.g., red, yellow, blue, green), pictures, words (e.g., "no," "failed" "error"), phrases (e.g., "the item is not present," "we are not good to go,"), images (e.g., thumbs up), icons, memes, similar indicators, or a combination of two or more thereof.

Figure 2:
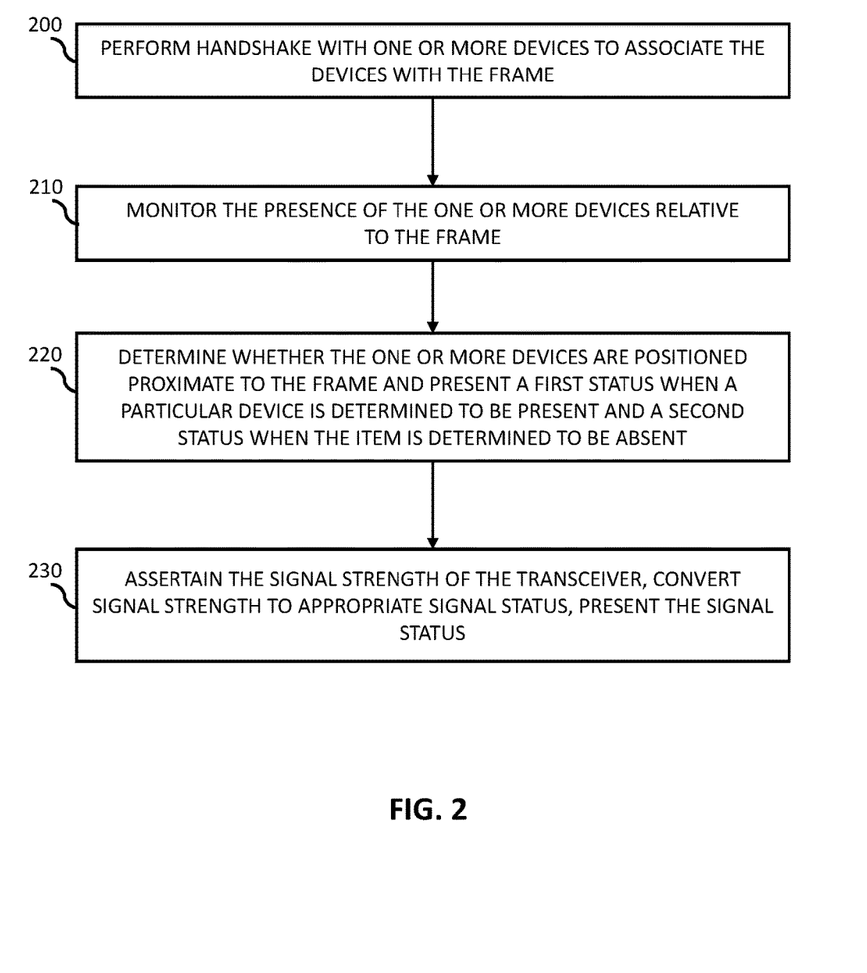
FIG. 2 illustrates the processing steps for assessing the contents of a wearable item, in accordance with some embodiments.

FIG. 2 illustrates the processing steps for assessing the contents of a wearable item, in accordance with some embodiments. In certain embodiments, devices of interest (e.g., the devices 165) are first identified (i.e. "paired") by the frame 110 to establish a list of known devices. In some aspects, a handshake (i.e. the process that establishes communication relationship between two networking devices) can be performed with one or more devices 165 at step 200 to establish a communication link between the device(s) 165 with the frame (e.g., via the one or more control circuits 112). For example, each device 165 can emit a code (e.g., authenticating information) that is received by the transceiver 116. In certain embodiments, received authenticating information are compared to known authenticating information, for example, stored in the data store 124 and/or an external data store.

In response to establishing congruence between the received authenticating information and the known authenticating information, a communications link (i.e. a relationship) can be established between the device 165 and the frame 110 (e.g., via the transceiver 116). In some embodiments, the device 165 and the frame 110 can establish a relationship by creating and/or storing (e.g., in data store 124 as known authenticating information) shared information (i.e. a link key). For example, if both devices store the same shared information, they are said to be paired or bonded. The presence of the one or more devices 165 relative to the frame 110 are monitored at step 210. For example, the presence of the authenticating code and/or link key can be monitored.

The presence of the one or more devices 165 proximate to the frame is determined at step 220. For example, in response to determining congruence between the received authenticating information and the known authenticating information, the presence of the device 165 relative to the frame 110 is determined. Further, at step 220, a first status is presented that reflects the presence of a particular device 165 and a second status is presented that reflect the absence of the particular device 165. In some embodiments, I/O device 118 emits a first status only in response to determining the presence of the device 165 else I/O device 118 emits a second status. For example, status information can be transmitted to device 130 for display on software stored on or accessed by the device 130.

In certain embodiments, the signal strength (i.e. RF source 140 power output) as received by the transceiver 116 can be ascertained at step 230, converted to an appropriate signal status, and presented. In some embodiments, the power output of the RF source 140 (e.g., as measured in mV/m or similar units of measure) can be determined and compared to a threshold power output value (e.g., store in data store 124) that reflects, for example, the minimum signal strength at which the RF source 140 can be received with a threshold quality supportive of normal operation of the frame 110 (i.e. the minimum signal strength that can be amplified by the control circuit(s) 112). Here, I/O device 118 emits a first or second signal status in response to determining that the power output of the RF source 140 is above or below, respectively, the threshold power output. In other embodiments, the determined power output of the RF source 140 can be compared to several threshold power outputs (e.g., gradations of signal strengths). For example, in response to determining that the minimum threshold power output is present, the control circuits 112 can increase the signal strength there (e.g., using any typical process to modify EM signals) and transmit the amplified signal via one or more of the antennas 117.

FIGS. 3-6 includes illustrative view of frames for assessing the contents of a wearable item, in accordance with some embodiments. In some embodiments, the frames 110 can be purchased/acquired (e.g., by consumers, manufactures, end users, retailer, and/or similar entities) to affix the frames 110 to wearable items and thereby enhance the user experience thereof using computing capabilities of the frames 110. In certain embodiments, the frames 100 have a structure and/or orientation that can be modified to one or more predetermined structures to facilitate inclusion into a variety of non-uniform wearable items (i.e. of various shapes and functions).

For example, the frames 110 can have a structure that can be augmented (e.g., cut, folded, bent, or similar physical modification) prior to adherence in to the wearable item 150. In certain embodiments, the frame 110 comprises a substrate having a plurality of sections positioned adjacent relative to each other and each distinguished by one or more demarcations (e.g., folding lines, creases, incision lines, fasteners, similar structures, or a combination of two or more thereof) and modifiable according to such demarcations. Two or more of the sections may be demountable relative to each other and/or rotatably mounted relative to each other. The structure and/or orientation of the frame 110 can be accomplished by one or more humans, machines, or a combination of two or more thereof.

In some embodiments, the sections can be cut, folded, demounted, dismantled, removed, repositioned, and/or bent by hand, using one or more tools, or a combination thereof to yield a particular desired structure and/or orientation. In certain embodiments, the sections may be formed in a manner to include one or more structural elements including, but not limited to, perforations, creases, ridges, partitions, divisions, portions, shares, arms, members, plugs, ribs, shoulders, tracks, bolts, fasteners, clamps, bolts, dowels, hooks, keepers, lugs, rivets, seams, similar structures, or a combination of two or more thereof. Such structural elements allow the frame 110 to selectively or permanently assume two or more different overall structures, orientations, or dispositions to facilitate its attachment to a wearable item 150.

Figure 3:
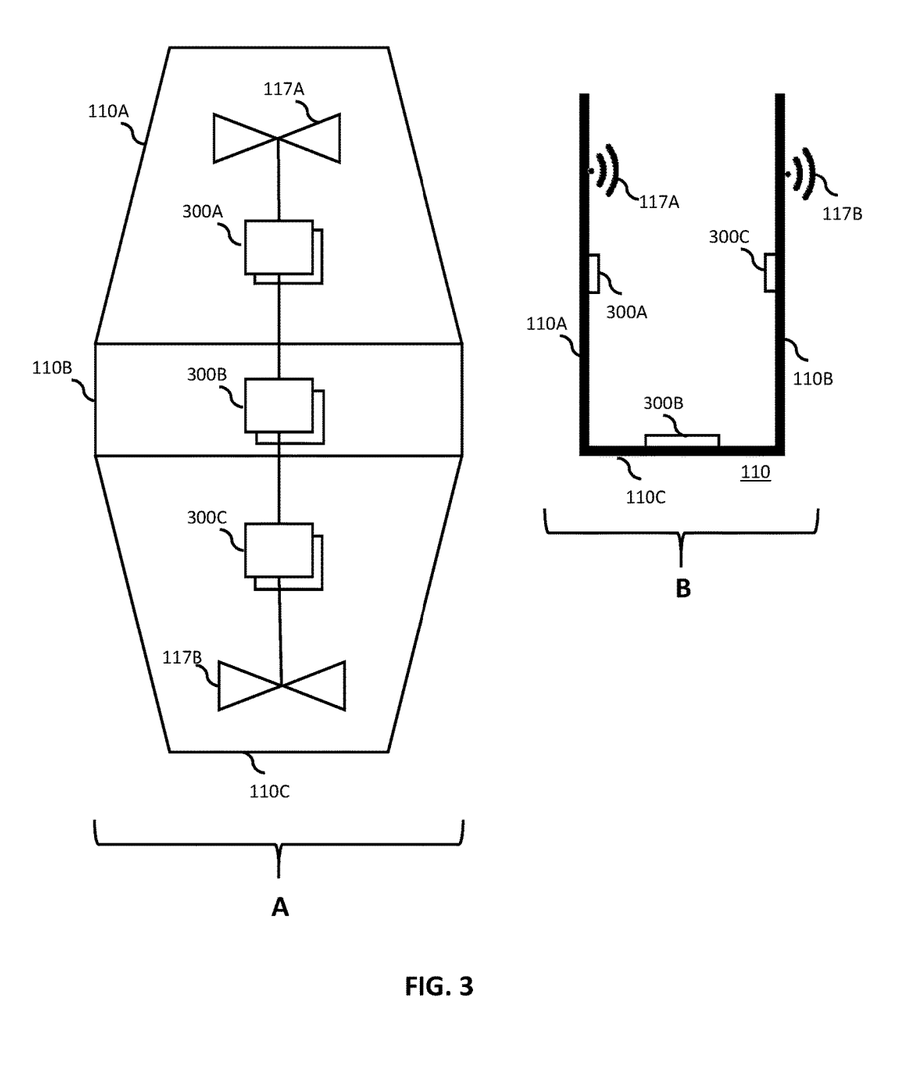
FIG. 3 is an illustrative view of a frame for assessing the contents of a wearable item, in accordance with some embodiments.

To further compliment the internal structure of the wearable items 150, the frames 110, in certain embodiments, can have or be modified to achieve an overall structure that is annular, arched, arcuate, barreled, channeled, circular, concaved, convexed, conical, corrugated, cupped, cylindric, disc-shaped, domed, elliptical, finned, flanged, folded, forked, helical, a similar shape, or a combination of two or more thereof. In some embodiments, the frames 110 can be manufactured to structurally complement the structure of one or more particular wearable items. Referring now to FIG. 3A, the top view of the frame 110 is depicted as a substantially planar unbent structure comprising at least sections 110A and 110C each coupled to section 110B. In certain embodiments, section 110B is the bottom portion (i.e. the lower most portion) of the frame 110.

In some embodiments, sections 110A, 110C, or both may be modified to have an angle of about 180° to about 90° relative to section 110B, as depicted in the side view of the frame 110 of FIG. 3B. For example, the frames 110 can include one or more components 300A, 300B, 300C, or a combination of two or more thereof affixed on or within one or more sections 110A, 110B, and/or 110C. As used herein, the one or more components of 300A, 300B, and/or 300C can include one or more sensors 114, transceivers 116, power buses 122, I/O devices 118, power sources 120, control circuits 112, data store 124, or a combination of two or more thereof. Antennas 117A and 117B are typically positioned on the frame 110 in a manner, number, orientation, or a combination of two or more thereof to facilitate the data transmission rates of the transceivers 116. For example, the antennas 117A and 117B may be affixed to the frame 110 in a manner to be oriented toward and away, respectively, the interior the wearable item 150 when affixed thereto. Here, the antennas 117A and 117B may be configured to facilitate communication with the RF sources 140 and the devices 165, respectively.

Figure 4:
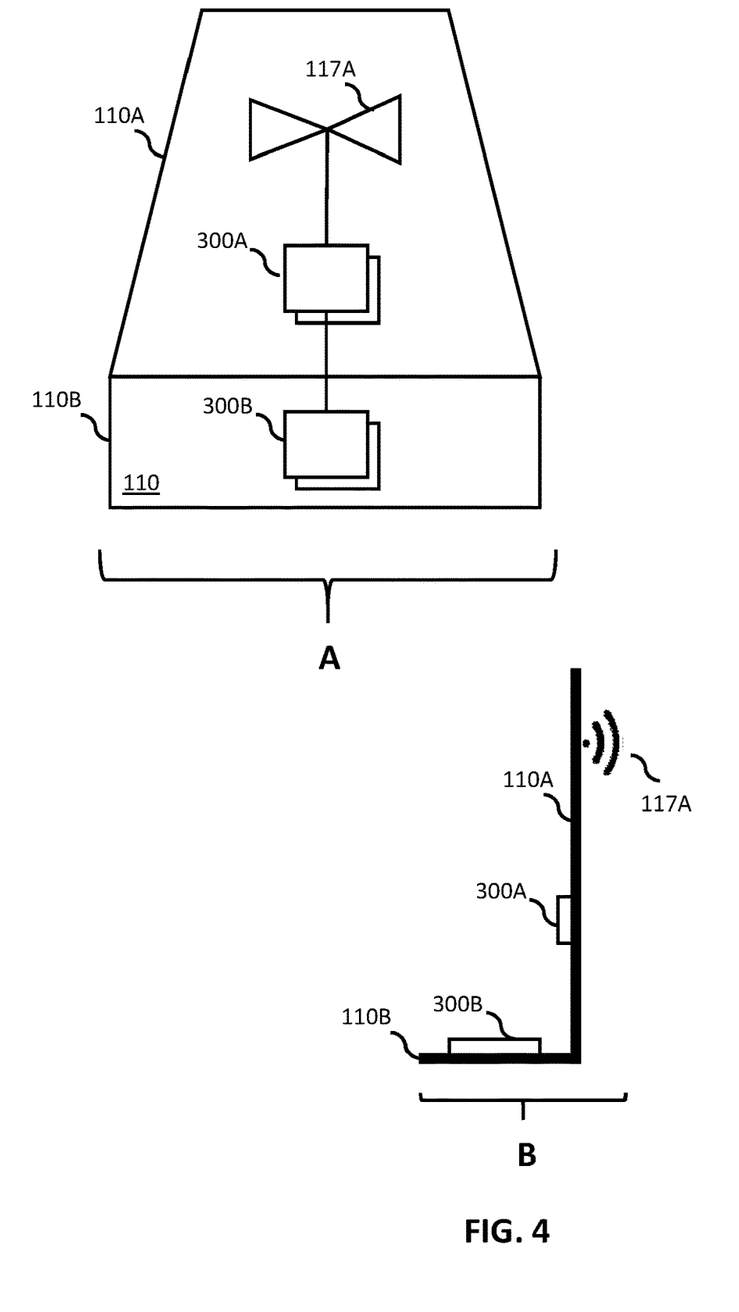
FIG. 4 is an illustrative top view of a frame for assessing the contents of a wearable item, in accordance with some embodiments.
Figure 5:
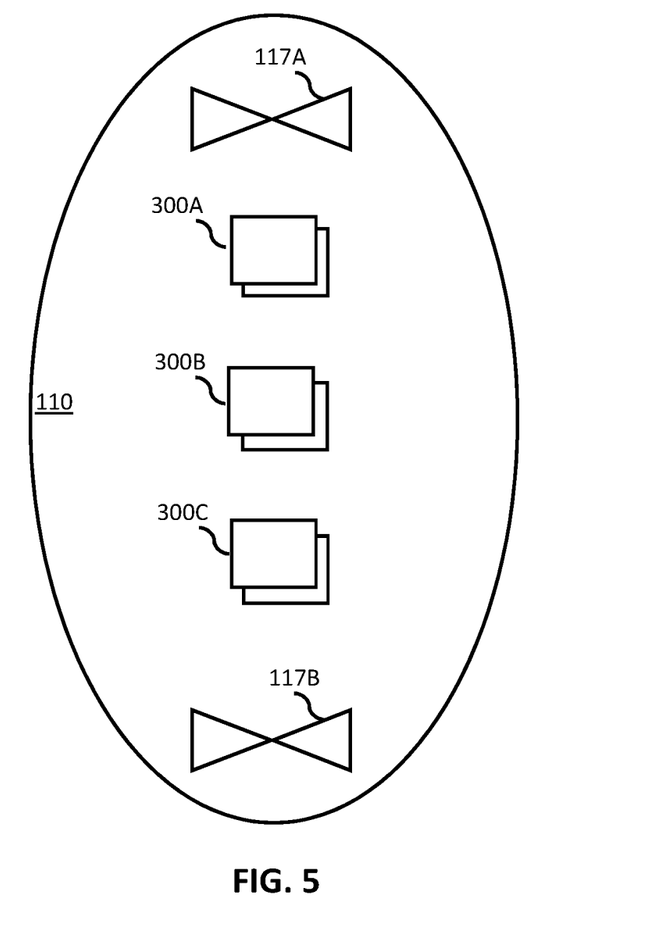
FIG. 5 is an illustrative view of a frame for assessing the contents of a wearable item, in accordance with some embodiments.
Figure 6:
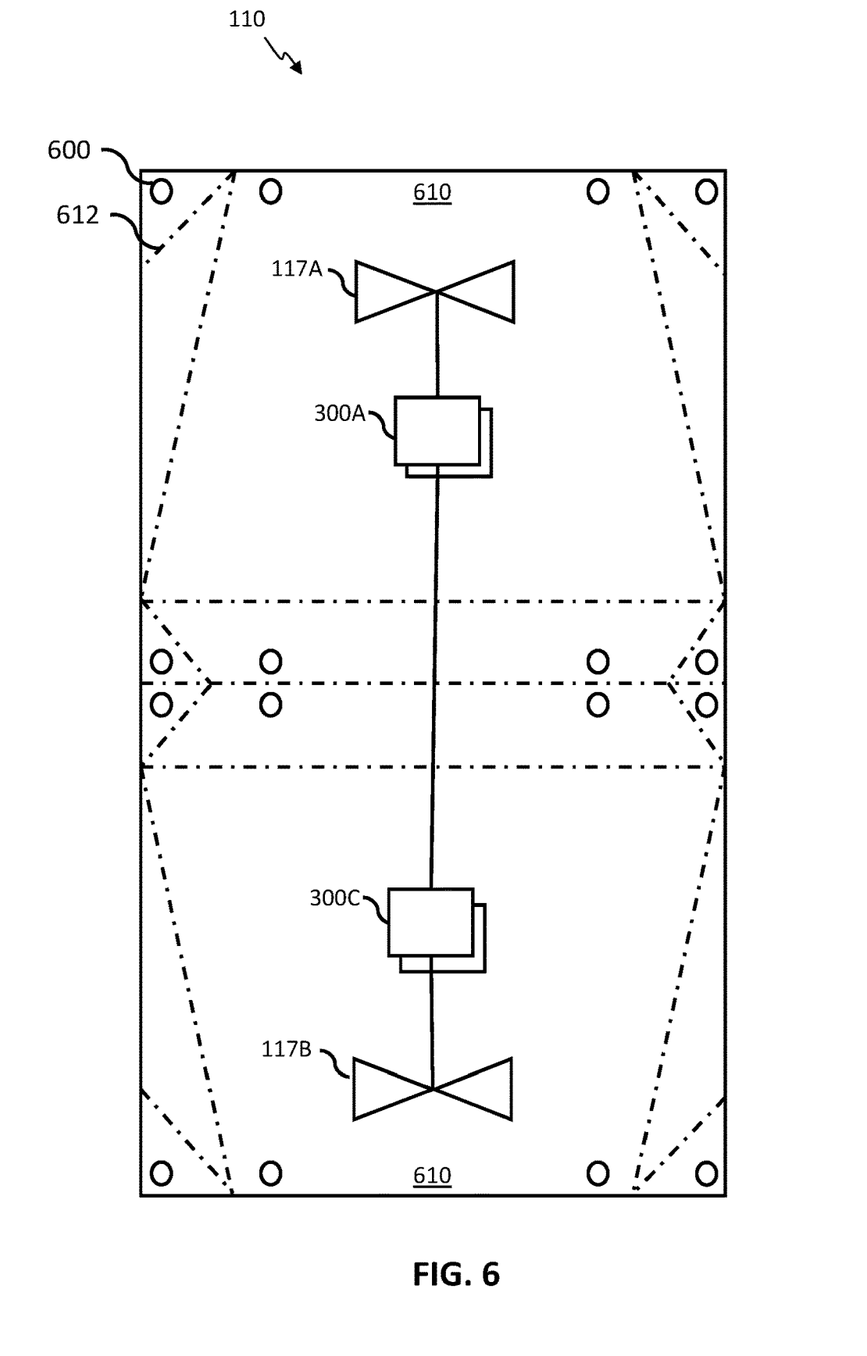
FIG. 6 is an illustrative view of a frame for assessing the contents of a wearable item, in accordance with some embodiments.

Images 4A and 4B of FIG. 4 depict a top view and a side view of the frame 110, in accordance with some embodiments. For example, the frame 110 can include one or more sections 110A each coupled to section 110B. The structures of the frame 110 depicted in FIGS. 3, 4, 5, or a combination of two or more thereof may depict an initial or a modified structure. FIG. 5 illustrates an ovular structure of the frame 110, in accordance with some embodiments. Here, the frame 110 has one substantially planar section and lacks a section that can be substantially horizontally oriented. For example, frame structures that lack horizontal portions may be well suited for brief cases, back packs, side accessible wearable items, and/or similar wearable items having one or more substantially planar surfaces. As discussed above, sections of the frames 110 can have one or more demarcations that can bent, folded, cut, creased, snapped, similar modifications, or a combination of two or more thereof. In certain embodiments, demarcations 612 can be indentations, perforations, creases, ridges, partitions, divisions, seams portions, or similar marking structures. For example, affixing elements 600 can be shares, arms, members, plugs, ribs, shoulders, tracks, bolts, fasteners, clamps, bolts, dowels, hooks, keepers, lugs, rivets, similar affixing elements, or a combination of two or more thereof.

Figure 8:
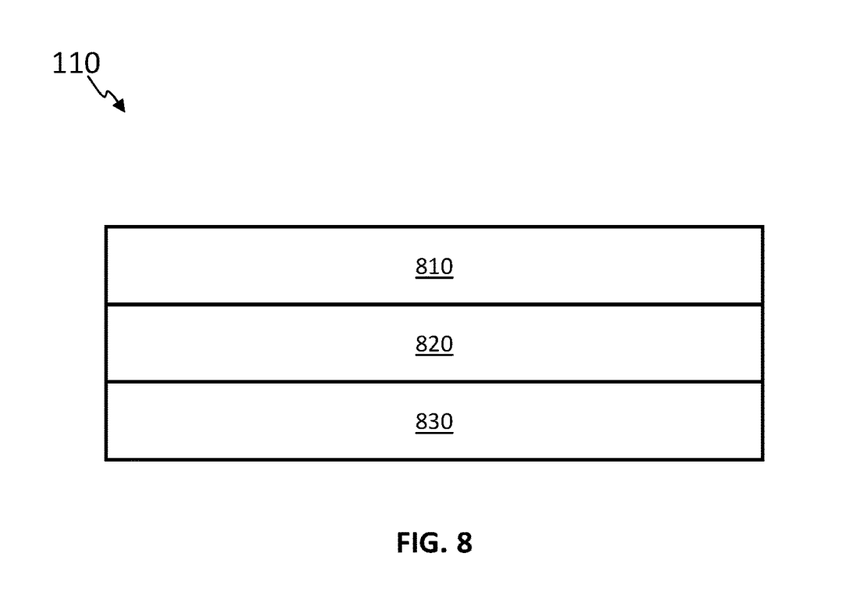
FIG. 8 illustrates a block diagram of a process for making the frame, in accordance with some embodiments.

FIG. 8 illustrates a block diagram of a process for making the frame, in accordance with an embodiment. In some embodiments, the frame 110 comprises one or more substrates each having one or more layers (e.g., layers 810, 820, 830, etc.). For example, layer 820 can be formed or affixed to layer 830. Layer 810 may be formed on or affixed to layer 820. One or more of the aforementioned electrical components can be positioned on a surface of layer 810 as well as be embedded between layers (e.g., layers 810 and 820 as well as layers 820 and 830). One or more of the layers can have a surface resistivity of at least $1\times10^5$ to $1\times10^{12}\Omega/$ square. In certain embodiments, one or more of the layers can have a surface resistivity of about $1\times10^7\Omega$/square (i.e. +/−2%). One or more of the layers can have a tensile strength of at least 300 kPa. One or more of the layers can under go up to 50% compression when exposed to pressure of at least 123 kPa.

In certain embodiments, at least one of the layers 810, 820, and 830 comprise a closed-cell polymer matrix configured to reduce the ingress of moisture (e.g., ingress of moisture at 1.5 meters for up to 30 minutes). In some aspects, at least one of the layers has a radius of curvature of up to 5 cm. The layers have to compatible with the operation of the antennas 117. For example, one or more of the layers may shift the frequency of operation of the antennas 117 by at most 8% or reduce efficiency thereof by up to 5% compared to data on the antennas 117 prior to incorporation on or in the layers. In certain embodiments, one or more thermistors (e.g., a negative temperature coefficient thermistor) may be affixed to a surface of one or more of the layers to monitor battery temperature.

For example, the thermistor may be communicatively coupled to the control circuit(s) 112, wherein as the thermistor heats up, the resistance of the thermistor increases and thereby restricts current. As the thermistor approaches its maximum temperature, the connection is broken and the electrical operation of the frame 110 may be shut off, thereby protecting one or more of the electrical components of the frame 110 (e.g., one or more of the power source 120, I/O device 118, control circuit 112, sensor 114, transceiver 116, and power bus 122). In some embodiments, layers can be affixed to one another using a thermally conductive epoxy adhesive (e.g., having a thermal conductivity of up to 1 W/m·L). For example, one or more of the electrical components may be encapsulated within the thermally conductive epoxy adhesive.

Figure 7:
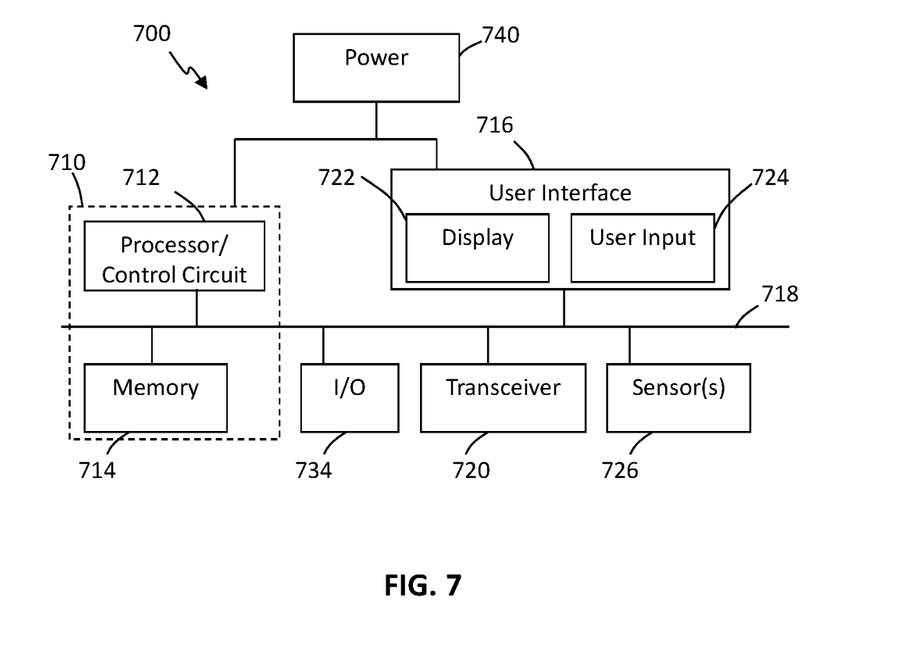
FIG. 7 illustrates an exemplary system for implementing at least some of the disclosed processes, in accordance with certain embodiments.

FIG. 7 illustrates an exemplary system 700 that may be used to implement some or all of the computing device or the control circuit 710, the electronic user device 730, one or more other control circuits and/or processing systems of the control circuit 710, one or more remote central control systems, and/or other such components, circuitry, functionality and/or devices. However, the use of the system 700 or any portion thereof is certainly not required.

By way of example, the system 700 may comprise a control circuit or processor module 712, memory 714, and one or more communication links, paths, buses or the like 718. Some embodiments may include one or more user interfaces 716, and/or one or more internal and/or external power sources or supplies 740. The control circuit 712 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 712 can be part of control circuitry and/or a control system 710, which may be implemented through one or more processors with access to one or more memory 714 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 700 may be used to implement one or more of the above or below, or parts of, components, circuits, systems, processes and the like.

The user interface 716 can allow a user to interact with the system 700 and receive information through the system. In some instances, the user interface 716 includes a display 722 and/or one or more user inputs 724, such as buttons, touch screen, track ball, keyboard, mouse, etc., which can be part of or wired or wirelessly coupled with the system 700. Typically, the system 700 further includes one or more communication interfaces, ports, transceivers 720 and the like allowing the system 700 to communicate over a communication bus, a distributed computer and/or communication network (e.g., a local area network (LAN), the Internet, wide area network (WAN), cellular etc.), communication link 718, other networks or communication channels with other devices and/or other such communications or combination of two or more of such communication methods. Further the transceiver 720 can be configured for wired, wireless, optical, fiber optical cable, satellite, or other such communication configurations or combinations of two or more of such communications. Some embodiments include one or more input/output (I/O) ports 734 that allow one or more devices to couple with the system 700. The I/O ports can be substantially any relevant port or combinations of ports, such as but not limited to USB, Ethernet, or other such ports. The I/O interface 734 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 726 to provide information to the system and/or sensor information that is communicated to another component, such as the central control system, a delivery vehicle, etc. The sensors can include substantially any relevant sensor, such as distance measurement sensors (e.g., optical units, sound/ultrasound units, etc.), cameras, motion sensors, inertial sensors, accelerometers, impact sensors, pressure sensors, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 700 comprises an example of a control and/or processor-based system with the control circuit 712. Again, the control circuit 712 can be implemented through one or more processors, controllers, central processing units, logic, software and the like. Further, in some implementations the control circuit 712 may provide multiprocessor functionality.

The memory 714, which can be accessed by the control circuit 712, typically includes one or more processor readable and/or computer readable media accessed by at least the control circuit 712, and can include volatile and/or nonvolatile media, such as RAM, ROM, EEPROM, flash memory and/or other memory technology. Further, the memory 714 is shown as internal to the control system 710; however, the memory 714 can be internal, external or a combination of internal and external memory. Similarly, some or all of the memory 714 can be internal, external or a combination of internal and external memory of the control circuit 712. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 714 can store code, software, executables, scripts, data, content, lists, programming, programs, log or history data, user information, customer information, product information, and the like. While FIG. 7 illustrates the various components being coupled together via a bus, it is understood that the various components may actually be coupled to the control circuit and/or one or more other components directly.

In some embodiments, a frame apparatus can comprise a substrate comprising a plurality of sections positioned adjacent relative to each other and each distinguished by one or more demarcations; one or more coupling elements configured to affix the substrate to a surface(s) of the wearable item; and a system positioned on one or more sections. The system can comprise one or more sensors (e.g., one or more devices configured to send/receive electromagnetism) and I/O devices each communicatively coupled to one or more control circuit(s).

The control circuits can be configured to receive, via the sensor, wireless signals transmitted by first computing device and thereby determine the presence of the first computing device within a threshold distance relative to the sensor. Statuses may be presented, via I/O devices, when triggering event are generated. Status may be selected from the group consisting of: a first status reflecting that the wireless signal is received (e.g., a triggering event) and a second status reflecting that the wireless signal has not been received (e.g., an additional triggering event). Wearable items can be personal items. Demarcation may include one or more of folding lines, creases, incision lines, and fasteners. The substrate can include an orientation configured to be modified according to one or more of the demarcations.

One or more conductive elements (e.g., antennas) can be positioned on one or more sections of the plurality of sections, each communicatively coupled to the control circuit(s) and configured to transmit and/or intercept electromagnetic energy. The conductive element may include a conductive composition comprising polymeric material and a three-dimensional network of fully exfoliated single sheets of graphene positioned therein. The fully exfoliated single sheets of graphene can have a surface area of 2,630 m$^2$/g. The frame may be included in a kit comprising assembly instructions that direct users to modify the substrate via one or more of the demarcations. The system can be configured to establish wireless local area networks with second computing device and communications links with cell sites. Wearable items disclosed herein may include the frame affixed to one or more surfaces thereof.

In some embodiments, methods are provided for forming a frame for assessing the contents of wearable items. A substrate can be formed to include a plurality of sections and one or more coupling elements, the plurality of sections positioned adjacent relative to each other and each distinguished by one or more demarcations. Coupling elements may be configured to affix the substrate to a surface(s) of the wearable item (e.g., a personal item). Demarcations may comprise one or more folding lines, creases, incision lines, and fasteners. The substrate may have an orientation configured to be modified according to the demarcations.

A system may be affixed on to a section(s) of the plurality of sections. The system may include one or more I/O devices communicatively coupled to one or more control circuits. A wireless signal transmitted by a device may be receives via a sensor(s) communicatively coupled to the control circuit (s). Presence of the device within a threshold distance relative to the frame determine may be determined using the sensor data. A first status may be presented via an I/O device communicatively coupled to the control circuit(s) when the wireless signal is received and a second status may be presented when the wireless signal is not received.

In some embodiments, forming the substrate can include forming one or more first sections of the plurality of sections to be demountable relative to one or more second sections of the plurality of sections. Forming the substrate, for example, may include forming first sections in a manner to be rotatably mounted to second sections of the plurality of sections. The method may further include transmitting, via a conductive element(s) communicatively coupled to the control circuit(s), electromagnetic energy. The conductive element may include a conductive composition that includes polymeric material and a three-dimensional network of fully exfoliated single sheets of graphene positioned within the polymeric material. The fully exfoliated single sheets of graphene may have a surface area of 2,630 m$^2$/g. A wireless local area network can be established using one or more of the control circuits with one or more second computing devices. A communications link with cell sites can be established using one or more of the control circuits.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A frame for assessing contents of a wearable item, comprising:
   a substrate comprising:
      a plurality of sections positioned adjacent relative to each other and each distinguished by a demarcation;
      a coupling element configured to affix the substrate to a surface of the wearable item;
      a system positioned on a section included in the plurality of sections comprising:
         a control circuit;
         a sensor communicatively coupled to the control circuit;
         an I/O device communicatively coupled to the control circuit;
         the control circuit configured to:
            receive, via the sensor, a wireless signal transmitted by a first computing device positioned proximate to a surface of an object positioned within the wearable item, and thereby determine a presence of the first computing device within a threshold distance relative to the sensor; and
            present, via the I/O device, a status when a triggering event is generated, the triggering event consisting of receiving the wireless signal or not receiving the wireless signal, the status selected from a group consisting of: a first status when the wireless signal is received and a second status when the wireless signal is not received; and
      wherein
         the wearable item is a personal item;
         the demarcation comprises one or more of a folding line, a crease, an incision line, and a fastener; and
         the substrate comprises an orientation configured to be modified according to the demarcation.

2. The frame of claim 1, wherein the plurality of sections comprise a first section and a second section that are demountable relative to each other.

3. The frame of claim 1, wherein the plurality of sections comprise a first section and a second section, the first section rotatably mounted to the second section.

4. The frame of claim 1, further comprising:
   a conductive element positioned on a section included in the plurality of sections, each communicatively coupled to the control circuit and configured to transmit and/or intercept electromagnetic energy; and
   wherein
      the conductive element comprises a conductive composition; and
      the conductive composition comprising a polymeric material and a three-dimensional network of fully exfoliated single sheets of graphene positioned therein.

5. The frame of claim 4, wherein the fully exfoliated single sheets of graphene comprise a surface area of 2630 $m^2/g$.

6. The frame of claim 1 in the form of a kit comprising assembly instructions that direct a user to modify the substrate via the demarcation of a section of the plurality of sections.

7. The frame of claim 1, wherein the system is configured to perform one or more of a following:
   establish a wireless local area network with a second computing device; and
   establish a communications link with a cell site.

8. A wearable item comprising the frame of claim 1 affixed to a surface thereof.

9. A method of forming a frame for assessing the contents of a wearable item, comprising:
   forming a substrate comprising a plurality of sections and a coupling element, the plurality of sections positioned adjacent relative to each other and each distinguished by a demarcation, the coupling element configured to affix the substrate to a surface of the wearable item, the wearable item is a personal item, the demarcation comprising one or more of a folding line, a crease, an incision line, a fastener, the substrate comprising an orientation configured to be modified according to the demarcation;
   affixing a system on to a section included in the plurality of sections, the system comprising a control circuit and an I/O device communicatively coupled to the control circuit;
   receiving, via a sensor communicatively coupled to the control circuit, a wireless signal transmitted by a device positioned proximate to a surface of an object positioned within the wearable item;
   determining, using the sensor data, a presence of the device within a threshold distance relative to the frame; and
   presenting, via an I/O device communicatively coupled to the control circuit, a first status when the wireless signal is received and a second status when the wireless signal is not received.

10. The method of claim 9, wherein forming the substrate comprises forming a first section of the plurality of sections to be demountable relative to a second section of the plurality of sections.

11. The method of claim 9, wherein forming the substrate comprises forming a first section of the plurality of sections in a manner to be rotatably mounted to a second section of the plurality of sections.

12. The method of claim 9, further comprising one or more of transmitting, via a conductive element communicatively coupled to the control circuit, electromagnetic energy, the conductive element comprising a conductive composition; the conductive composition comprising a polymeric material and a three-dimensional network of fully exfoliated single sheets of graphene positioned therein; and the fully exfoliated single sheets of graphene comprise a surface area of 2630 $m^2/g$.

13. The method of claim 9, further comprising establishing, via the control circuit, a wireless local area network with a second computing device.

14. The method of claim 9, further comprising establishing, via the control circuit, a communications link with a cell site.

* * * * *